United States Patent
Ko

(10) Patent No.: US 9,138,116 B2
(45) Date of Patent: Sep. 22, 2015

(54) MOVEMENT OPERATION SYSTEM FOR AUTONOMOUS MOVING CLEANING APPARATUS

(71) Applicant: Joseph Y. Ko, Laguna Niguel, CA (US)

(72) Inventor: Joseph Y. Ko, Laguna Niguel, CA (US)

( * ) Notice: Subject to any disclaimer, the term of this patent is extended or adjusted under 35 U.S.C. 154(b) by 147 days.

(21) Appl. No.: 14/140,324

(22) Filed: Dec. 24, 2013

(65) Prior Publication Data

US 2014/0107838 A1    Apr. 17, 2014

Related U.S. Application Data

(63) Continuation-in-part of application No. 13/465,313, filed on May 7, 2012.

(51) Int. Cl.
*G06F 19/00* (2011.01)
*A47L 9/00* (2006.01)
*G05D 1/02* (2006.01)

(52) U.S. Cl.
CPC .............. *A47L 9/009* (2013.01); *G05D 1/0225* (2013.01); *G05D 1/0234* (2013.01); *G05D 1/0242* (2013.01); *A47L 2201/04* (2013.01); *G05D 2201/0203* (2013.01); *G05D 2201/0215* (2013.01)

(58) Field of Classification Search
CPC . G05D 1/0225; G05D 1/0234; G05D 1/0242; G05D 2201/0203; G05D 2201/0215; A47L 9/009; A47L 2201/04
USPC .......................................................... 700/245
See application file for complete search history.

(56) References Cited

U.S. PATENT DOCUMENTS

| | | | |
|---|---|---|---|
| 6,594,844 B2 | 7/2003 | Jones | |
| 6,883,201 B2 * | 4/2005 | Jones et al. | 15/319 |
| 2003/0137268 A1 * | 7/2003 | Papanikolopoulos et al. | 318/568.11 |
| 2013/0138247 A1 * | 5/2013 | Gutmann et al. | 700/253 |

* cited by examiner

*Primary Examiner* — Calvin Cheung
*Assistant Examiner* — Paula L Schneider
(74) *Attorney, Agent, or Firm* — Muncy, Geissler, Olds & Lowe, P.C.

(57) ABSTRACT

A movement operation system for autonomous moving cleaning apparatus comprises a virtual wall apparatus and an autonomous moving cleaning apparatus. The virtual wall apparatus includes an infrared ray emitter. The autonomous moving cleaning apparatus includes an infrared ray receiver and a microcontroller unit. The infrared ray emitter emits at least one encrypted infrared signal within an emission zone. When the autonomous moving cleaning apparatus enters the emission zone and the infrared ray receiver receives the encrypted infrared signal, the microcontroller unit controls the autonomous moving cleaning apparatus to move away from the virtual wall apparatus. The encrypted infrared signal can be encrypted in different codes or operating frequencies to prevent the autonomous moving cleaning apparatus from being interfered by external lights or other infrared rays so that it can operate steadily.

21 Claims, 7 Drawing Sheets

MOVEMENT OPERATION SYSTEM FOR AUTONOMOUS MOVING CLEANING APPARATUS

This application is a continuation-in-part, and claims priority, of from U.S. patent application Ser. No. 13/465,313 filed on May 7, 2012, entitled "METHOD FOR OPERATING AUTONOMOUS MOVING CLEANING APPARATUS", the entire contents of which are hereby incorporated by reference.

FIELD OF THE INVENTION

The present invention relates to an autonomous moving cleaning apparatus and particularly to a movement operation system for autonomous floor sweeping machines, vacuum cleaners or floor moping machines.

BACKGROUND OF THE INVENTION

U.S. Pat. Nos. 6,883,201 and 6,594,844 disclose autonomous moving cleaning apparatus that can serve as a floor sweeping machine, a vacuum cleaner or a floor moping machine. It has a plurality of sensors located at the lower side, front side or periphery to prevent strong impact when encountering obstacles, or falling to a descending staircase to result in damage of the floor sweeping machine, vacuum cleaner or floor moping machine. To avoid those apparatus from impact or falling down they have to rely on the sensors to provide correct information so that they can move forwards, decelerate, move backwards or stop moving.

However, in the aforesaid conventional techniques, malfunction often occurs to the floor sweeping machine, vacuum cleaner or floor moping machine. This is caused by too many types of lights existing in the external environments during operation. Hence when the sensors receive those lights, they cannot correctly judge or interpret to result in abnormal forward movement, deceleration, backward movement or stop. This also makes their lifespan shorter and becomes the biggest problem of the conventional products yet to be resolved.

SUMMARY OF THE INVENTION

The primary object of the present invention is to overcome the aforesaid disadvantages of the conventional techniques by providing a movement operation system to enable an autonomous moving cleaning apparatus to function steadily without being interfered by external lights or infrared rays.

To achieve the foregoing object, the present invention provides a movement operation system for autonomous moving cleaning apparatus that comprises a virtual wall apparatus and an autonomous moving cleaning apparatus. The virtual wall apparatus includes an infrared ray emitter to emit at least one encrypted infrared signal. The infrared ray emitter has a present emission zone for the encrypted infrared signal to emit. The autonomous moving cleaning apparatus includes a battery, a driving wheel, a floor sweeping roller, at least one servomotor, an infrared ray receiver, a microcontroller unit (MCU in short hereinafter), a light emitter and a light receiver. The battery provides electric power for the autonomous moving cleaning apparatus to operate. The servomotor drives the driving wheel and floor sweeping roller. The driving wheel drives the autonomous moving cleaning apparatus to move to enable the floor sweeping roller to clean dirt on a floor.

The MCU controls the servomotor to rotate and provides a digital signal which is processed through an encoding technique to form an encrypted code data set for sending out continuously. When the autonomous moving cleaning apparatus enters the emission zone, the infrared ray receiver outputs the received encrypted infrared signal to the MCU, and the MCU decodes the encrypted infrared signal to generate a control signal to control the servomotor to move the autonomous moving cleaning apparatus away from the emission zone of the virtual wall apparatus.

The light emitter is activated by a voltage sent and converted by the MCU. The light receiver receives the light from the light emitter and converts it and sends to the MCU. The function key aims to select preset functions provided by the MCU to control the servomotor. The data values in the encrypted code data set are converted to a low or high voltage to activate the light emitter to generate dim or bright light. The light receiver incessantly receives reflective dim or bright light generated by the light emitter to form a corresponding low or high voltage which is then converted to a corresponding digital signal for providing to the MCU to compare with the encrypted code data set for decoding. The MCU, according to decoding correctness and strong, weak, present or absent condition of the detected digital signal, can control the servomotor to rotate forward, decelerate, rotate backward or stop rotating.

In one embodiment the encrypted code data set is formed via a Manchester encoding technique.

In another embodiment the MCU further includes an encoder to form the encrypted code data set and a decoder to compare the digital signal with the encrypted code data set for decoding.

In yet another embodiment the autonomous moving cleaning apparatus further includes an electronic switch controlled by the data values of the encrypted code data set and an analog-to-digital converter (A/D converter in short hereinafter) to convert the low or high voltage formed by the light received by the light receiver to the corresponding digital signal.

In yet another embodiment the autonomous moving cleaning apparatus is a floor sweeping machine.

In yet another embodiment the encrypted infrared signal includes a first encrypted infrared signal with a first operating frequency and a second encrypted infrared signal with a second operating frequency.

In yet another embodiment the virtual wall apparatus has a power source module for providing electric power to the virtual wall apparatus.

To achieve the foregoing object, the present invention provides another movement operation system for autonomous moving cleaning apparatus that comprises a virtual wall apparatus and an autonomous moving cleaning apparatus. The virtual wall apparatus includes an infrared ray emitter to emit at least one encrypted infrared signal. The infrared ray emitter has a present emission zone for the encrypted infrared signal to emit. The autonomous moving cleaning apparatus includes a battery, a driving wheel, a dust suction fan motor, at least one servomotor, an infrared ray receiver, an MCU, a light emitter and a light receiver. The battery provides electric power for the autonomous moving cleaning apparatus to operate. The servomotor drives the driving wheel and dust suction fan motor. The driving wheel drives the autonomous moving cleaning apparatus to move to enable the dust suction fan motor to clean dirt on a floor.

The MCU provides a digital signal which is processed through an encoding technique to form an encrypted code data set for sending out continuously and controls the servomotor to rotate. When the autonomous moving cleaning apparatus enters the emission zone, the infrared ray receiver outputs the received encrypted infrared signal to the MCU, and the MCU decodes the encrypted infrared signal to generate a control signal to control the servomotor to move the autonomous moving cleaning apparatus away from the emission zone of the virtual wall apparatus.

The light emitter is activated by a voltage sent and converted by the MCU. The light receiver receives the light from the light emitter and converts it and sends to the MCU. The function key aims to select preset functions provided by the MCU to control the dust suction fan motor and servomotor. The data values in the encrypted code data set are converted to a low or high voltage to activate the light emitter to generate dim or bright light. The light receiver incessantly receives the reflective dim or bright light generated by the light emitter to form a corresponding low or high voltage which is then converted to a corresponding digital signal for providing to the MCU to compare with the encrypted code data set for decoding. The MCU, according to decoding correctness and strong, weak, present or absent condition of the detected digital signal, can control the servomotor to rotate forward, decelerate, rotate backward or stop rotating.

In one embodiment the encrypted code data set is formed via a Manchester encoding technique.

In another embodiment the MCU further includes an encoder to form the encrypted code data set and a decoder to compare the digital signal with the encrypted code data set for decoding.

In yet another embodiment the autonomous moving cleaning apparatus further includes an electronic switch controlled by the data values of the encrypted code data set and an A/D converter to convert the low or high voltage formed by the light received by the light receiver to the corresponding digital signal.

In yet another embodiment the autonomous moving cleaning apparatus is a vacuum cleaner with a dust suction port at a lower side thereof connecting with the dust suction fan motor.

In yet another embodiment the encrypted infrared signal includes a first encrypted infrared signal with a first operating frequency and a second encrypted infrared signal with a second operating frequency.

In yet another embodiment the virtual wall apparatus has a power source module for providing electric power to the virtual wall apparatus.

To achieve the foregoing object, the present invention provides another movement operation system for autonomous moving cleaning apparatus that comprises a virtual wall apparatus and an autonomous moving cleaning apparatus. The virtual wall apparatus includes an infrared ray emitter to emit at least one encrypted infrared signal. The infrared ray emitter has a present emission zone for the encrypted infrared signal to emit. The autonomous moving cleaning apparatus includes a battery, a driving wheel, at least one servomotor, an infrared ray receiver, an MCU, a light emitter and a light receiver. The battery provides electric power for the autonomous moving cleaning apparatus to operate. The servomotor drives the driving wheel. The driving wheel drives the autonomous moving cleaning apparatus to move.

The MCU provides a digital signal which is processed through an encoding technique to form an encrypted code data set for sending out continuously and controls the servomotor to rotate. When the autonomous moving cleaning apparatus enters the emission zone, the infrared ray receiver outputs the received encrypted infrared signal to the MCU, and the MCU decodes the encrypted infrared signal to generate a control signal to control the servomotor to move the autonomous moving cleaning apparatus away from the emission zone of the virtual wall apparatus.

The light emitter is activated by a voltage sent and converted by the MCU. The light receiver receives the light from the light emitter and converts it and sends to the MCU. The function key aims to select preset functions provided by the MCU to control the servomotor. The data values in the encrypted code data set are converted to a low or high voltage to activate the light emitter to generate dim or bright light. The light receiver incessantly receives the reflective dim or bright light generated by the light emitter to form a corresponding low or high voltage which is then converted to a corresponding digital signal for providing to the MCU to compare with the encrypted code data set for decoding. The MCU, according to decoding correctness and strong, weak, present or absent condition of the detected digital signal, can control the servomotor to rotate forward, decelerate, rotate backward or stop rotating.

In one embodiment the encrypted code data set is formed via a Manchester encoding technique.

In another embodiment the microcontroller unit further includes an encoder to form the encrypted code data set and a decoder to compare the digital signal with the encrypted code data set for decoding.

In yet another embodiment the autonomous moving cleaning apparatus further includes an electronic switch controlled by the data values of the encrypted code data set and an A/D converter to convert the low or high voltage formed by the light received by the light receiver to the corresponding digital signal.

In yet another embodiment the autonomous moving cleaning apparatus is a floor moping machine with a floor moping element attached to a lower side thereof to clean dirt of a floor.

In yet another embodiment the encrypted infrared signal includes a first encrypted infrared signal with a first operating frequency and a second encrypted infrared signal with a second operating frequency.

In yet another embodiment the virtual wall apparatus has a power source module for providing electric power to the virtual wall apparatus.

The movement operation system for autonomous moving cleaning apparatus according to the invention functions mainly by emitting an encrypted infrared signal into the emission zone. When the autonomous moving cleaning apparatus enters the emission zone to receive the encrypted infrared signal emitted by the virtual wall apparatus, the autonomous moving cleaning apparatus is controlled to move away from the virtual wall apparatus. The encrypted infrared signal can be encrypted in different codes or operating frequencies to prevent the autonomous moving cleaning apparatus from being interfered by external lights or other infrared rays so that it can operate steadily.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
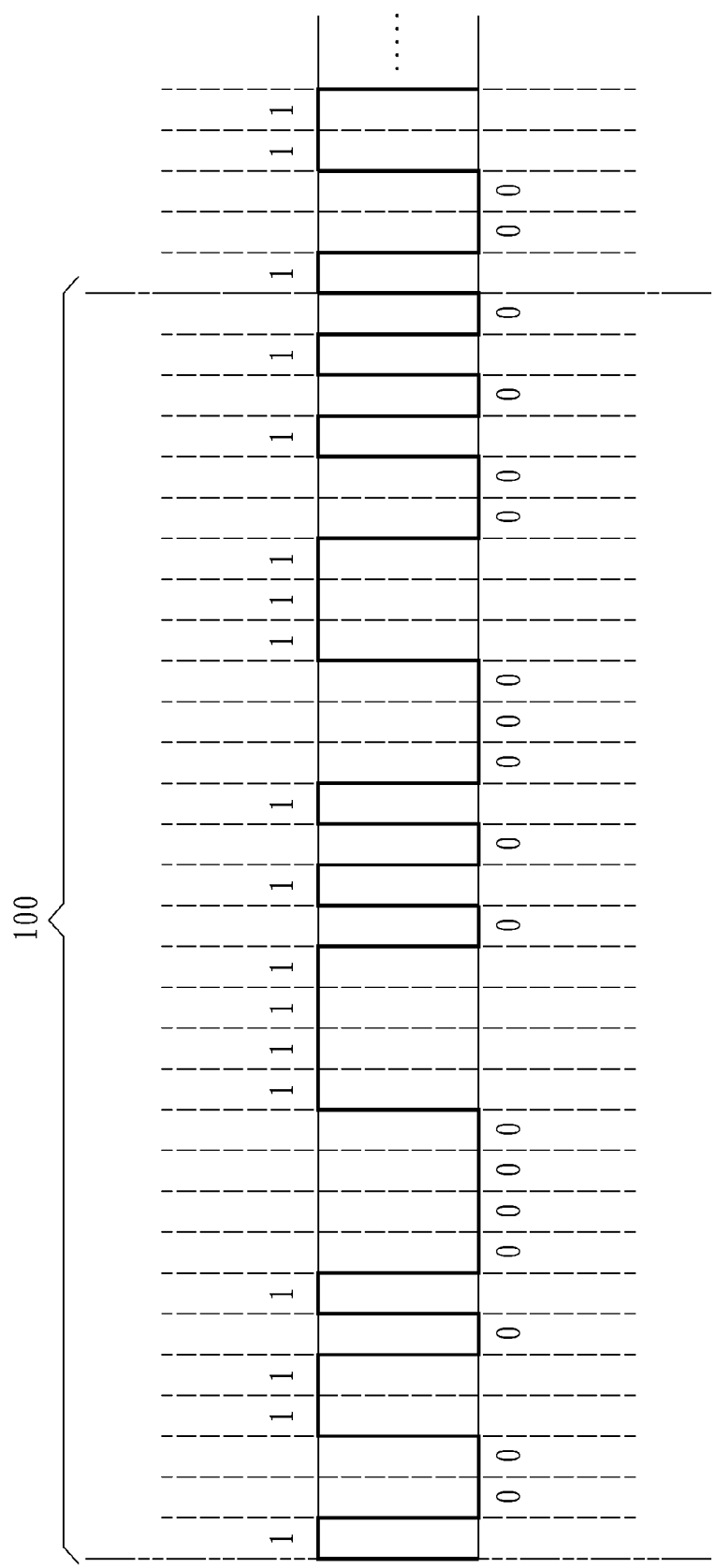
FIG. 1 is a schematic graph showing consecutive digital signals of an encrypted code data set according to the invention.
Figure 2:
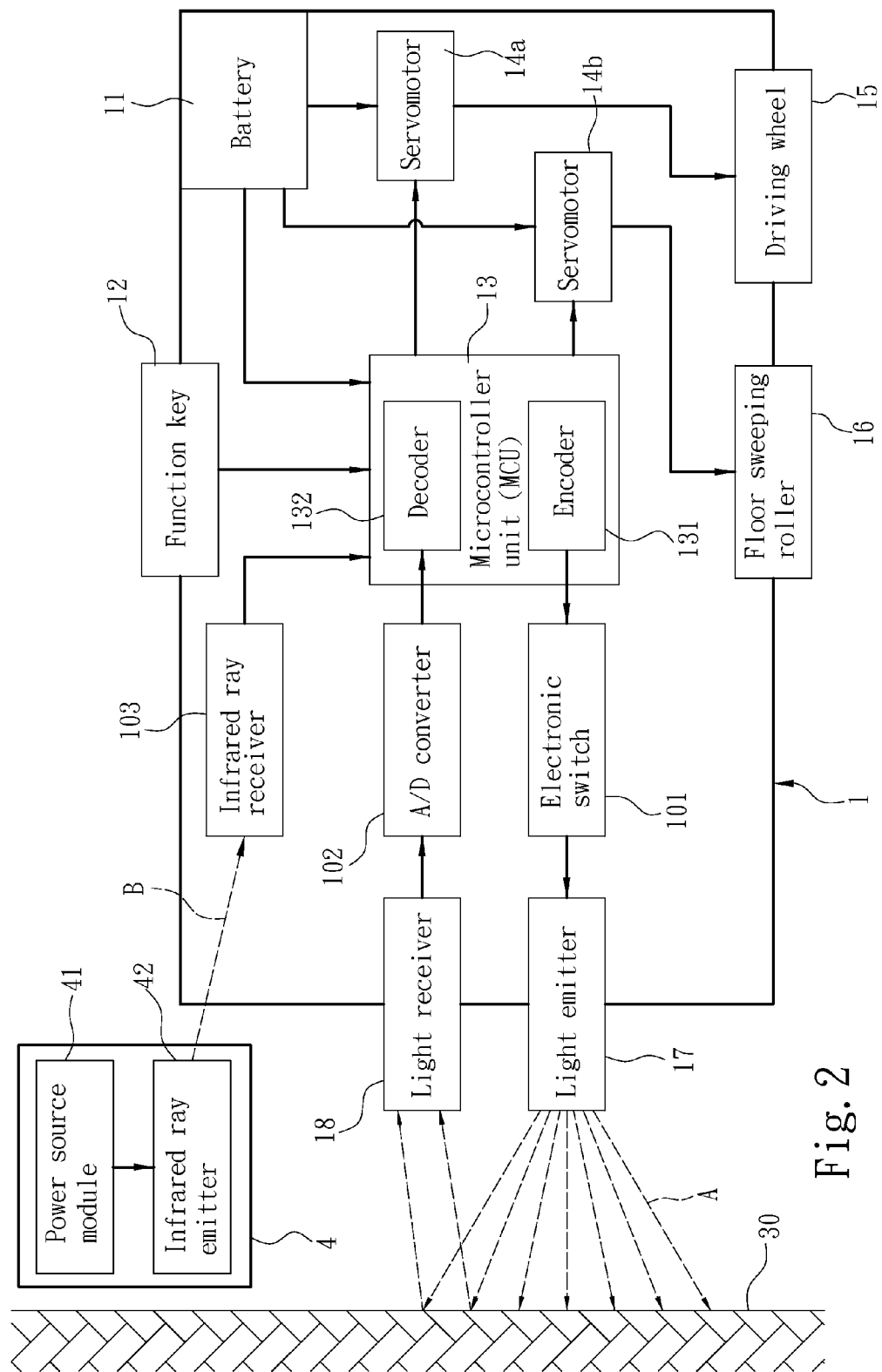
FIG. 2 is a schematic block diagram of a first embodiment of the movement operation system of the invention.
Figure 7:
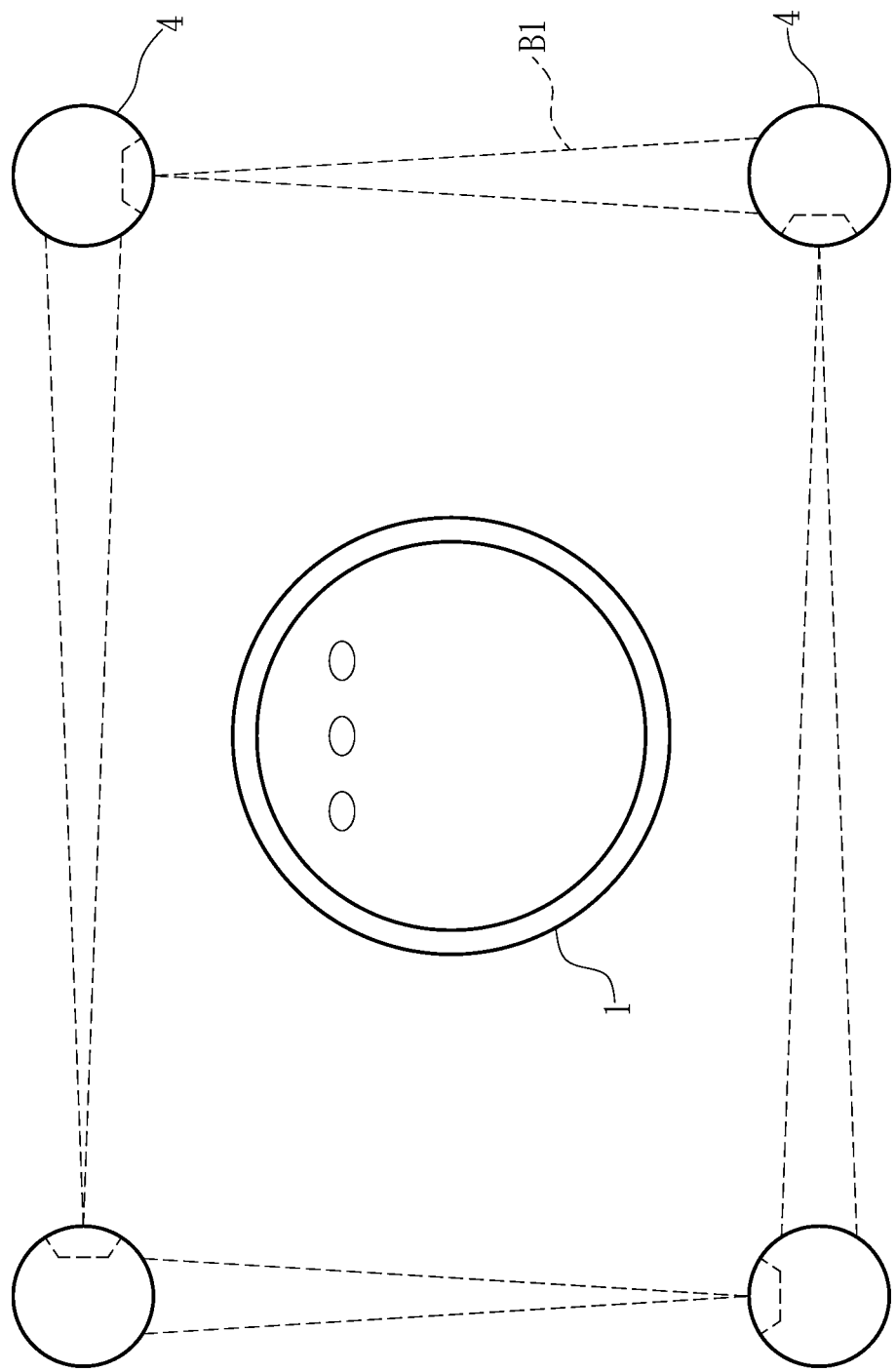
FIG. 7 is a schematic view of the movement operation system of the invention in a use condition.

Please refer to FIGS. 1, 2 and 7, the present invention aims to provide a movement operation system for autonomous moving cleaning apparatus that comprises an autonomous moving cleaning apparatus 1 and at least one virtual wall apparatus 4. The virtual wall apparatus 4 includes a power source module 41 to provide electric power for the virtual wall apparatus 4 and an infrared ray emitter 42 to emit at least one infrared ray B. The infrared ray B includes at least one encrypted infrared signal. The infrared ray emitter 42 has a preset emission zone B1 for the encrypted infrared signal (the infrared ray B) to emit. The autonomous moving cleaning apparatus 1 includes a battery 11, a driving wheel 15, a floor sweeping roller 16, at least one servomotor 14a and 14b, an infrared ray receiver 103 and a microcontroller unit (MCU) 13. The battery 11 provides electric power for the autonomous moving cleaning apparatus 1 to operate. The MCU 13 controls the servomotors 14a and 14b to rotate. The servomotor 14a further drives the driving wheel 15 to move the autonomous moving cleaning apparatus 1, while the servomotor 14b also drives the floor sweeping roller 16 to clean dirt on a floor.

The MCU 13 provides a digital signal which is processed through an encoding technique, such as a Manchester encoding technique, to form an encrypted code data set 100 (referring to FIG. 1) like "1001101000011110101000111001010" for sending out continuously. When the autonomous moving cleaning apparatus 1 enters the emission zone B1 (referring to FIG. 7), the infrared ray receiver 103 outputs the received encrypted infrared signal to the MCU 13, and the MCU 13 decodes the encrypted infrared signal to generate a control signal to control the servomotors 14a and 14b to move the autonomous moving cleaning apparatus 1 away from the emission zone B1 of the virtual wall apparatus 4 without hitting thereof. Multiple virtual wall apparatus 4 also can be provided at different corners (as shown in FIG. 7). The emission zones B1 (also can be called virtual walls) formed by projection of the infrared ray emitters 42 are in different directions to surround and form a virtual space (such as a preset cleaning zone), thereby the autonomous moving cleaning apparatus 1 can be confined within the virtual space to operate.

The autonomous moving cleaning apparatus 1 also includes a light emitter 17 (such as an LED tube) activated by a voltage transmitted and converted by the MCU 13, a light receiver 18 to receive light A from the light emitter 17 and convert the light and transmit to the MCU 13, and a function key 12 to select preset functions provided by the MCU 13 to control the servomotors 14a and 14b. The MCU 13 further can include an encoder 131 to form the encrypted code data set 100 and a decoder 132 to compare the digital signal with the encrypted code data set 100 for decoding. The autonomous moving cleaning apparatus 1 also can include an electronic switch 101 (such as a triode or MOS tube) controlled by data values of the encrypted code data set 100 and an A/D converter 102 to convert the low or high voltage formed by the light A received by the light receiver 18 to the corresponding digital signal. Thus, the MCU 13 can continuously send the encrypted code data sets 100 with their data values converted to the low or high voltage through the electronic switch 101 to activate the light emitter 17 to generate dim or bright light A. The light receiver 18 incessantly receives the light reflected by an obstacle 30 from the dim or bright light A to form a corresponding low or high voltage which is then converted by the A/D converter 102 to become a corresponding digital signal for providing to the MCU 13 to compare with the encrypted code data set 100 for decoding so that the MCU 13 can control the servomotors 14a and 14b to rotate forward, decelerate, rotate backward or stop rotating according to decoding correctness and strong, weak, present or absent condition of the detected digital signal. The autonomous moving cleaning apparatus 1 is a floor sweeping machine.

Figure 5:
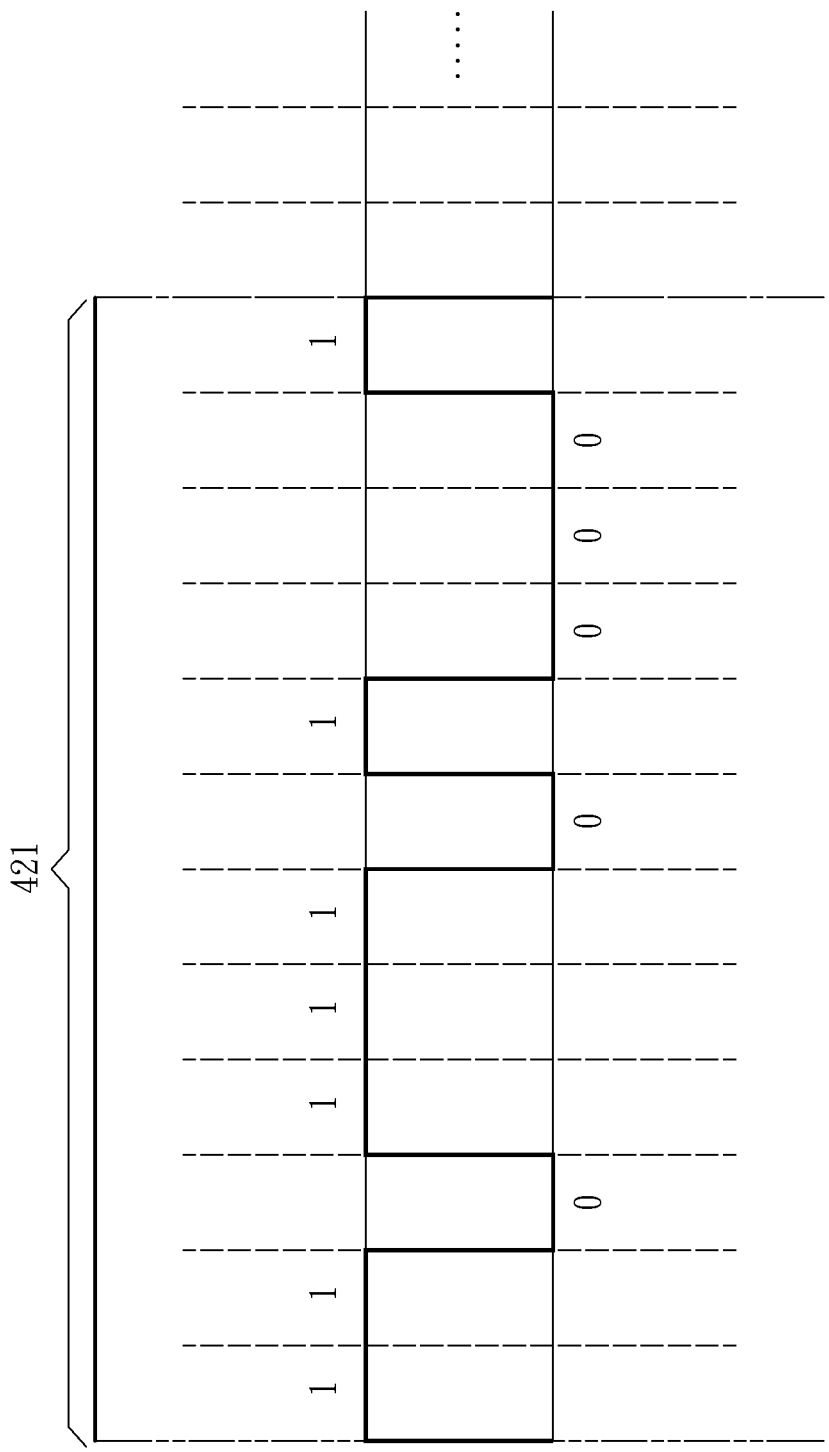
FIG. 5 is a schematic graph showing consecutive digital signals of a first encrypted infrared signal.
Figure 6:
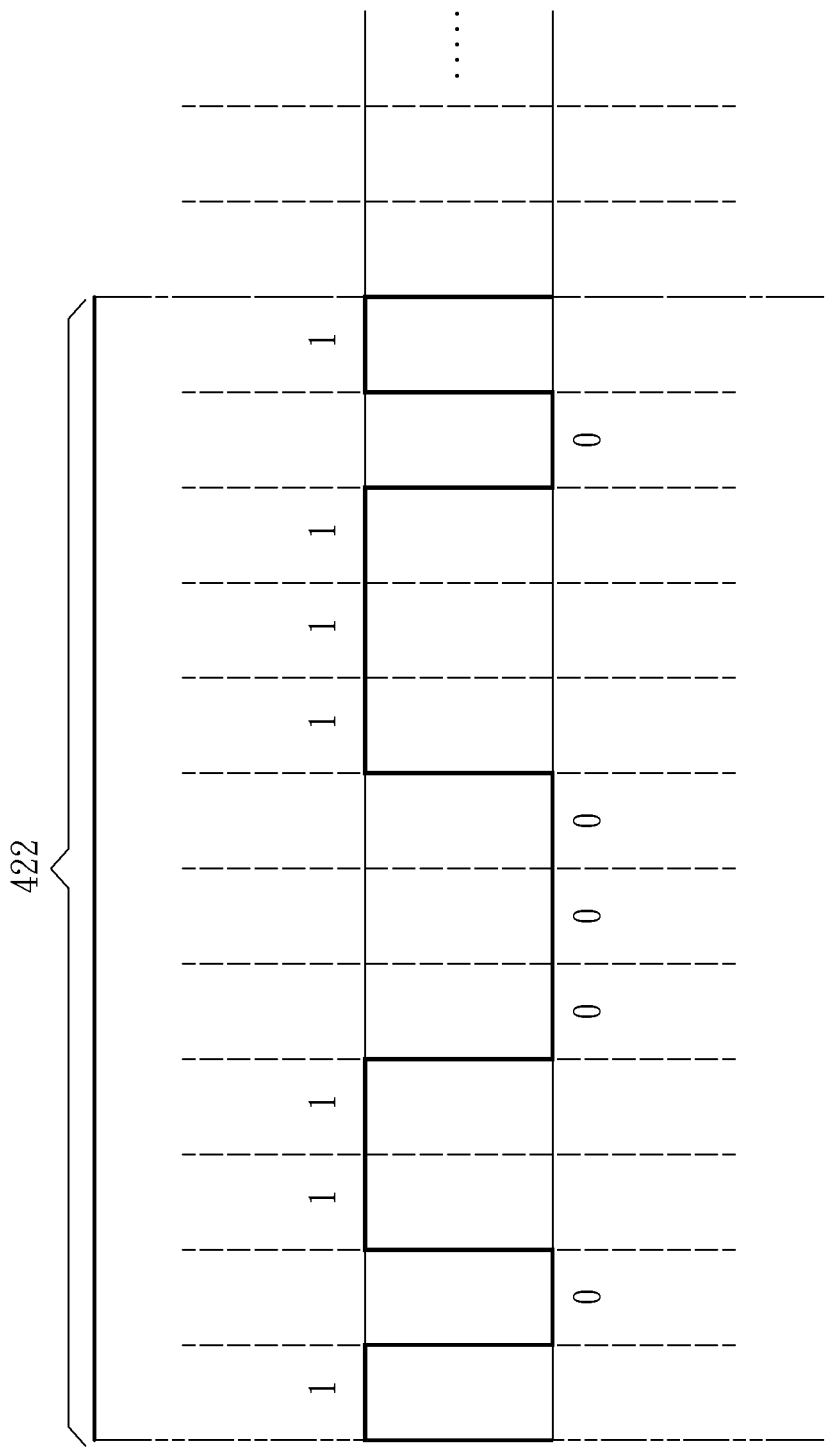
FIG. 6 is a schematic graph showing consecutive digital signals of a second encrypted infrared signal.

Please refer to FIGS. 5 and 6 for the continuous digital signals of the first and second encrypted infrared signals. The encrypted infrared signal further includes a first encrypted infrared signal 421 with a first encrypted code and a first operating frequency, and a second encrypted infrared signal 422 with a second encrypted code and a second operating frequency. That means the infrared ray emitter 42 can emit the first encrypted infrared signal 421 and second encrypted infrared signal 422 in different encrypted codes, such as the encrypted code of the first encrypted infrared signal 421 being 110111010001, while the encrypted code of the second encrypted infrared signal 422 being 101100011101; or the infrared ray emitter 42 can emit the first encrypted infrared signal 421 and second encrypted infrared signal 422 in a same encrypted code but different operating frequencies, such as 38 KHZ for the first encrypted infrared signal 421 and 50 KHZ for the second encrypted infrared signal 422, thereby the autonomous moving cleaning apparatus 1 can identify the received infrared signal against other infrared ray sources (such as infrared rays emitted from other machinery, sunlight or other lamp lights).

Figure 3:
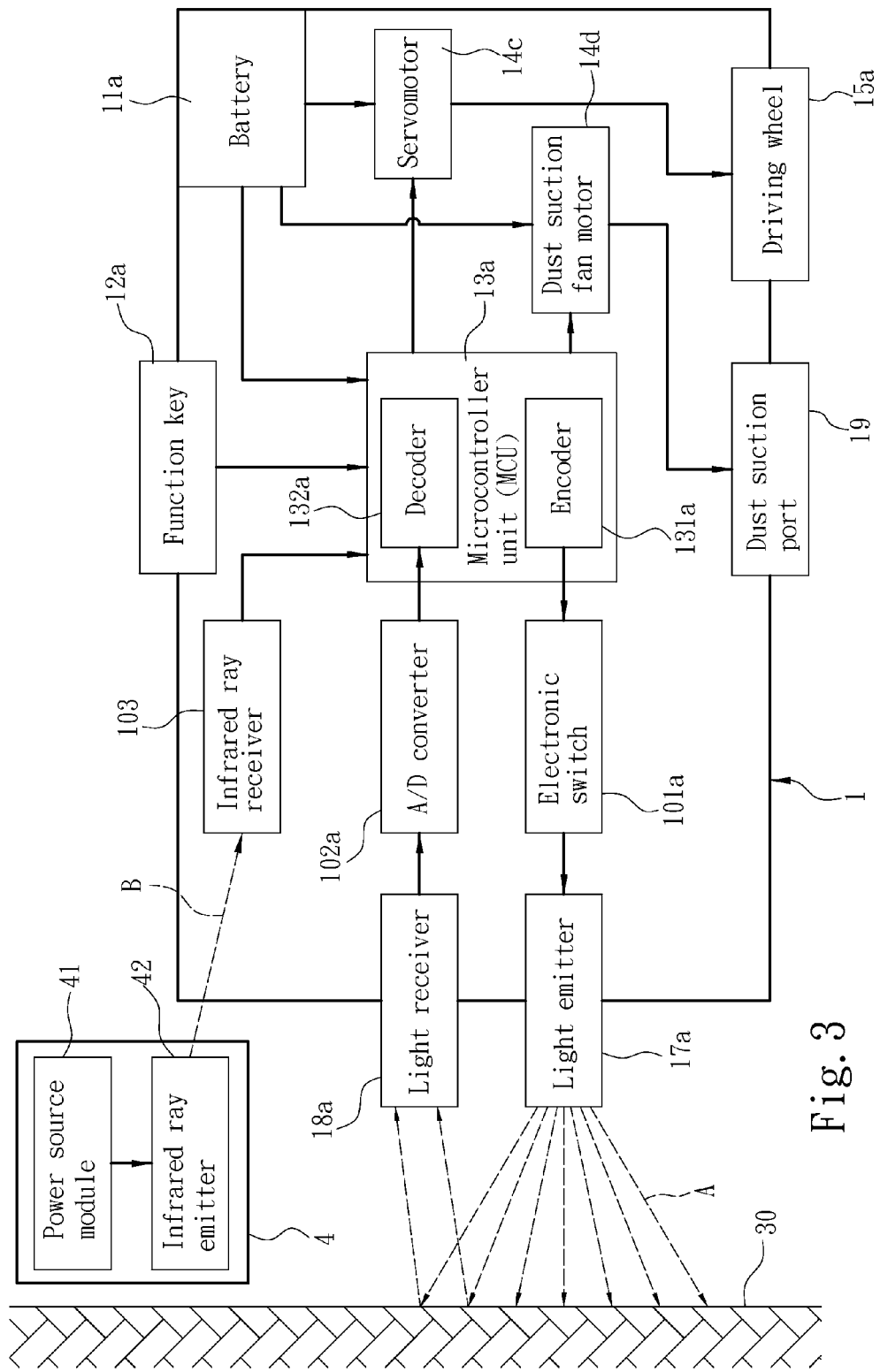
FIG. 3 is a schematic block diagram of a second embodiment of the movement operation system of the invention.

Please refer to FIGS. 3 and 7 for a second embodiment of the movement operation system for autonomous moving cleaning apparatus according to the invention. It comprises an autonomous moving cleaning apparatus 1 and at least one virtual wall apparatus 4. The virtual wall apparatus 4 includes a power source module 41 to provide electric power for the virtual wall apparatus 4 and an infrared ray emitter 42 to emit at least one infrared ray B. The infrared ray B includes at least one encrypted infrared signal. The infrared ray emitter 42 has a preset emission zone B1 for the encrypted infrared signal (the infrared ray B) to emit. The autonomous moving cleaning apparatus 1 includes at least a battery 11a, a driving wheel 15a, a dust suction fan motor 14d, at least one servomotor 14c, an infrared ray receiver 103 and an MCU 13a. The battery 11a provides electric power for the autonomous moving cleaning apparatus 1 to operate. The MCU 13a controls the servomotor 14c and the dust suction fan motor 14d to rotate. The servomotor 14c further drives the driving wheel 15a to move the autonomous moving cleaning apparatus 1. The dust suction fan motor 14d is also driven to clean dirt on a floor.

The MCU 13a provides a digital signal which is processed through an encoding technique, such as a Manchester encoding technique, to form an encrypted code data set 100 for sending out continuously. When the autonomous moving cleaning apparatus 1 enters the emission zone B1 (referring to FIG. 7), the infrared ray receiver 103 outputs the received encrypted infrared signal to the MCU 13a, and the MCU 13a decodes the encrypted infrared signal to generate a control signal to control the servomotor 14c to move the autonomous moving cleaning apparatus 1 away from the emission zone B1 of the virtual wall apparatus 4 without hitting thereof. Multiple virtual wall apparatus 4 also can be provided at different corners (as shown in FIG. 7). The emission zones B1 (also can be called virtual walls) formed by projection of the infrared ray emitters 42 are in different directions to surround and form a virtual space (such as a preset cleaning zone), thereby the autonomous moving cleaning apparatus 1 can be confined within the virtual space to operate.

The autonomous moving cleaning apparatus 1 also includes a light emitter 17*a* (such as an LED tube) activated by a voltage transmitted and converted by the MCU 13*a*, a light receiver 18*a* to receive light A from the light emitter 17*a* and convert the light and transmit to the MCU 13*a*, and a function key 12*a* to select preset functions provided by the MCU 13*a* to control the dust suction fan motor 14*d* and servomotor 14*c*. The MCU 13*a* further can include an encoder 131*a* to form the encrypted code data set 100 (as shown in FIG. 1) and a decoder 132*a* to compare the digital signal with the encrypted code data set 100 for decoding. The autonomous moving cleaning apparatus 1 also can include an electronic switch 101*a* (such as a triode or MOS tube) controlled by data values of the encrypted code data set 100 and an A/D converter 102*a* to convert the low or high voltage formed by the light A received by the light receiver 18*a* to the corresponding digital signal. Thus, the MCU 13*a* can continuously send the encrypted code data sets 100 with their data values converted to the low or high voltage through the electronic switch 101*a* to activate the light emitter 17*a* to generate dim or bright light A. The light receiver 18*a* incessantly receives the light reflected by an obstacle 30 from the dim or bright light A to form a corresponding low or high voltage which is then converted by the A/D converter 102*a* to become a corresponding digital signal for providing to the MCU 13*a* to compare with the encrypted code data set 100 for decoding so that the MCU 13*a* can control the servomotors 14*c* to rotate forward, decelerate, rotate backward or stop rotating according to decoding correctness and strong, weak, present or absent condition of the detected digital signal. The autonomous moving cleaning apparatus 1 is a vacuum cleaner with a dust suction port 19 at a lower side connecting with the dust suction fan motor 14*d*.

Please refer to FIGS. 5 and 6 for the continuous digital signals of the first and second encrypted infrared signals. The encrypted infrared signal further includes a first encrypted infrared signal 421 with a first encrypted code and a first operating frequency and a second encrypted infrared signal 422 with a second encrypted code and a second operating frequency. That means the infrared ray emitter 42 can emit the first encrypted infrared signal 421 and second encrypted infrared signal 422 in different encrypted codes, such as the encrypted code of the first encrypted infrared signal 421 being 110111010001, while the encrypted code of the second encrypted infrared signal 422 being 101100011101; or the infrared ray emitter 42 can emit the first encrypted infrared signal 421 and second encrypted infrared signal 422 in a same encrypted code but different operating frequencies, such as 38 KHZ for the first encrypted infrared signal 421 and 50 KHZ for the second encrypted infrared signal 422, thereby the autonomous moving cleaning apparatus 1 can identify the received infrared signal against other infrared ray sources (such as infrared rays emitted from other machinery, sunlight or other lamp lights).

Figure 4:
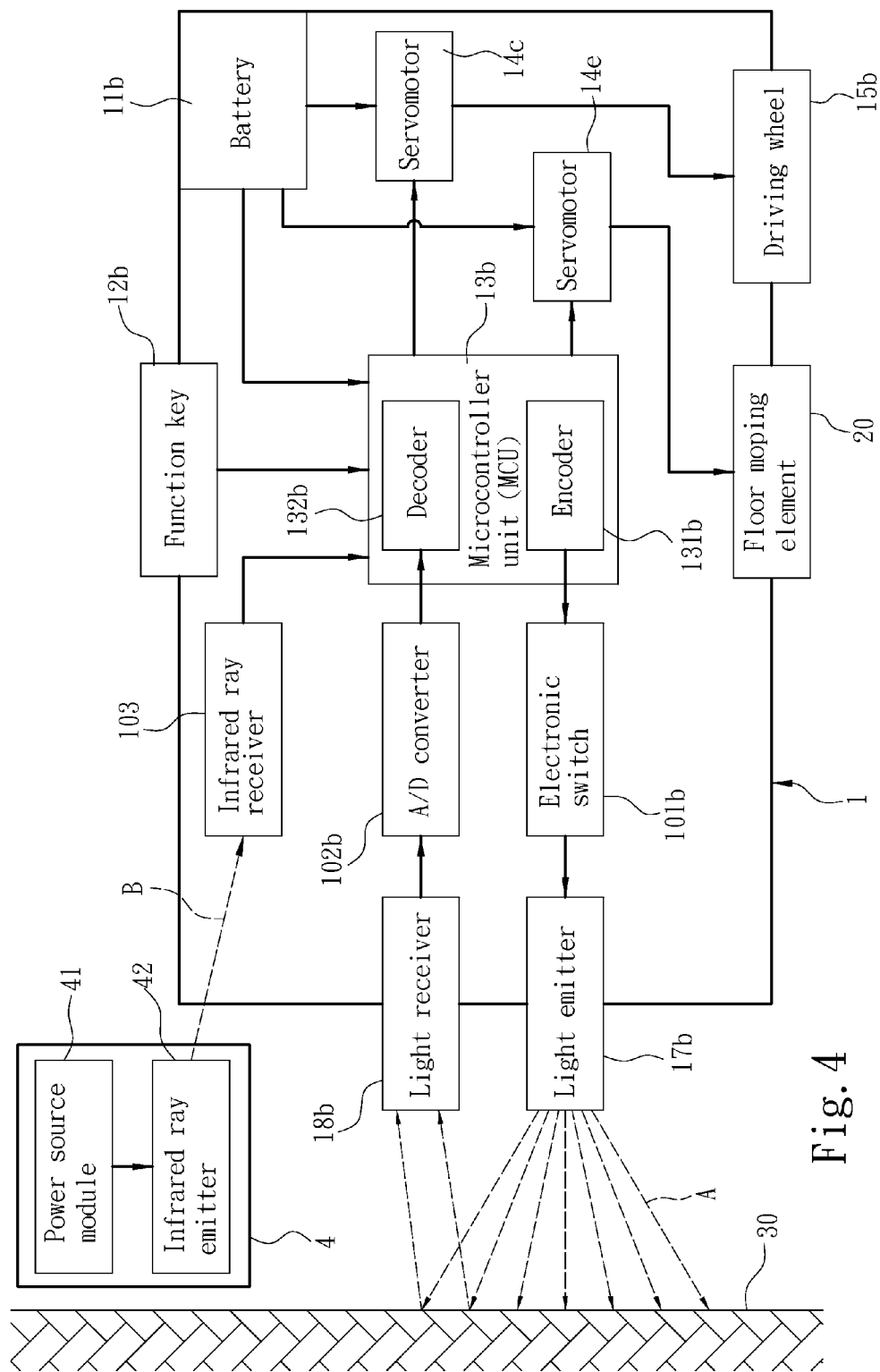
FIG. 4 is a schematic block diagram of a third embodiment of the movement operation system of the invention.

Please refer to FIGS. 4 and 7 for a third embodiment of the movement operation system for autonomous moving cleaning apparatus according to the invention. It comprises an autonomous moving cleaning apparatus 1 and at least one virtual wall apparatus 4. The virtual wall apparatus 4 includes a power source module 41 to provide electric power for the virtual wall apparatus 4 and an infrared ray emitter 42 to emit at least one infrared ray B. The infrared ray B includes at least one encrypted infrared signal. The infrared ray emitter 42 has a preset emission zone B1 for the encrypted infrared signal (the infrared ray B) to emit. The autonomous moving cleaning apparatus 1 includes at least a battery 11*b*, a driving wheel 15*b*, at least one servomotor 14*c* and 14*e*, an infrared ray receiver 103 and an MCU 13*b*. The battery 11*b* provides electric power for the autonomous moving cleaning apparatus 1 to operate. The MCU 13*b* controls the servomotors 14*c* and 14*e* to rotate. The servomotor 14*c* further drives the driving wheel 15*b* to move the autonomous moving cleaning apparatus 1.

The MCU 13*b* provides a digital signal which is processed through an encoding technique, such as a Manchester encoding technique, to form an encrypted code data set 100 for sending out continuously. When the autonomous moving cleaning apparatus 1 enters the emission zone B1 (referring to FIG. 7), the infrared ray receiver 103 outputs the received encrypted infrared signal to the MCU 13*b*, and the MCU 13*b* decodes the encrypted infrared signal to generate a control signal to control the servomotor 14*c* to move the autonomous moving cleaning apparatus 1 away from the emission zone B1 of the virtual wall apparatus 4 without hitting thereof. Multiple virtual wall apparatus 4 also can be provided at different corners (as shown in FIG. 7). The emission zones B1 (also can be called virtual walls) formed by projection of the infrared ray emitters 42 are in different directions to surround and form a virtual space (such as a preset cleaning zone), thereby the autonomous moving cleaning apparatus 1 can be confined within the virtual space to operate.

The autonomous moving cleaning apparatus 1 also includes a light emitter 17*b* (such as an LED tube) activated by a voltage transmitted and converted by the MCU 13*b*, a light receiver 18*b* to receive light A from the light emitter 17*b* and convert the light and transmit to the MCU 13*b*, and a function key 12*b* to select preset functions provided by the MCU 13*b* to control the servomotors 14*c* and 14*e*. The MCU 13*b* further can include an encoder 131*b* to form the encrypted code data set 100 (as shown in FIG. 1) and a decoder 132*b* to compare the digital signal with the encrypted code data set 100 for decoding. The autonomous moving cleaning apparatus 1 also can include an electronic switch 101*b* (such as a triode or MOS tube) controlled by data values of the encrypted code data set 100 and an A/D converter 102*b* to convert the low or high voltage formed by the light A received by the light receiver 18*b* to the corresponding digital signal. Thus, the MCU 13*b* can continuously send the encrypted code data sets 100 with their data values converted to the low or high voltage through the electronic switch 101*b* to activate the light emitter 17*b* to generate dim or bright light A. The light receiver 18*b* incessantly receives the light reflected by an obstacle 30 from the dim or bright light A to form a corresponding low or high voltage which is then converted by the A/D converter 102*b* to become a corresponding digital signal for providing to the MCU 13*b* to compare with the encrypted code data set 100 for decoding so that the MCU 13*b* can control the servomotor 14*c* to rotate forward, decelerate, rotate backward or stop rotating according to decoding correctness and strong, weak, present or absent condition of the detected digital signal. The autonomous moving cleaning apparatus 1 is a floor moping machine with a floor moping element 20 attached to a lower side thereof to clean dirt on a floor. The floor moping element 20 can be a flat plate with a moping cloth or paper towel attached thereon.

Please also refer to FIGS. 5 and 6 for the continuous digital signals of the first and second encrypted infrared signals. The encrypted infrared signal further includes a first encrypted infrared signal 421 with a first encrypted code and a first operating frequency and a second encrypted infrared signal 422 with a second encrypted code and a second operating frequency. That means the infrared ray emitter 42 can emit the first encrypted infrared signal 421 and second encrypted infrared signal 422 in different encrypted codes, such as the encrypted code of the first encrypted infrared signal 421 being 110111010001, while the encrypted code of the second encrypted infrared signal 422 being 101100011101; or the infrared ray emitter 42 can emit the first encrypted infrared signal 421 and second encrypted infrared signal 422 in a same encrypted code but different operating frequencies, such as 38 KHZ for the first encrypted infrared signal 421 and 50 KHZ for the second encrypted infrared signal 422, thereby the autonomous moving cleaning apparatus 1 can identify the received infrared signal against other infrared ray sources (such as infrared rays emitted from other machinery, sunlight or other lamp lights).

As a conclusion, the movement operation system for autonomous moving cleaning apparatus of the invention functions mainly by emitting an encrypted infrared signal into the emission zone B1. When the autonomous moving cleaning apparatus 1 enters the emission zone B1, the infrared ray receiver 103 outputs the received encrypted infrared signal to the MCU 13, 13a and 13b, and the MCU 13, 13a and 13b decodes the encrypted infrared signal to generate a control signal to control the servomotors 14a, 14b, 14c, 14d and 14e to move the autonomous moving cleaning apparatus 1 away from the emission zone B1 of the virtual wall apparatus 4 without hitting thereof. Namely, after the autonomous moving cleaning apparatus 1 has entered the emission zone B1 and received the encrypted infrared signal emitted by the virtual wall apparatus 4, the autonomous moving cleaning apparatus 1 can move away from the virtual wall apparatus 4 without hitting thereof. Moreover, multiple virtual wall apparatus 4 also can be provided at different corners and surrounded to form a virtual space, such that the autonomous moving cleaning apparatus 1 can be confined within the virtual space to operate. Furthermore, the encrypted infrared signal can be encrypted in different codes or different operating frequencies for the autonomous moving cleaning apparatus 1 to identify whether the infrared ray is valid or belongs to other infrared ray sources so that the autonomous moving cleaning apparatus 1 can steadily and smoothly perform operation without being interfered by the external lights.

What is claimed is:

1. A movement operation system for autonomous moving cleaning apparatus, comprising:
   at least one virtual wall apparatus including an infrared ray emitter which emits at least one encrypted infrared signal and includes a preset emission zone for the encrypted infrared signal to emit; and
   an autonomous moving cleaning apparatus including:
      a battery providing electric power for the autonomous moving cleaning apparatus to operate;
      a driving wheel for driving the autonomous moving cleaning apparatus to move;
      a floor sweeping roller for cleaning dirt on a floor;
      at least one servomotor for driving the driving wheel and the floor sweeping roller;
      an infrared ray receiver for receiving the encrypted infrared signal;
      a microcontroller unit which controls the servomotor to rotate and provides a digital signal processed via an encoding technique to form an encrypted code data set for sending out continuously and receives the encrypted infrared signal output from the infrared ray receiver when the autonomous moving cleaning apparatus enters the emission zone and decodes the encrypted infrared signal to generate a control signal for controlling the servomotor to move the autonomous moving cleaning apparatus away from the emission zone of the virtual wall apparatus;
      a light emitter which is activated by a voltage sent and converted by the microcontroller unit;
      a light receiver for receiving light from the light emitter and converting the light for sending to the microcontroller unit for operation; and
      a function key for selecting preset functions provided by the microcontroller unit to control the servomotor;
   wherein the encrypted code data set includes data values which are converted to a low or a high voltage to activate the light emitter to generate dim or bright light, and wherein the light receiver receives the reflective dim or bright light from the light emitter continuously to form a corresponding low or high voltage which is then converted to a corresponding digital signal for providing to the microcontroller unit to compare with the encrypted code data set for decoding so that the microcontroller unit controls the servomotor to rotate forward, decelerate, rotate backward or stop rotating according to correctness of the decoding and the detected digital signal in a strong, weak, present or absent condition.

2. The movement operation system of claim 1, wherein the encrypted code data set is formed via a Manchester encoding technique.

3. The movement operation system of claim 1, wherein the microcontroller unit further includes an encoder for forming the encrypted code data set and a decoder for comparing the digital signal with the encrypted code data set for decoding.

4. The movement operation system of claim 1, wherein the autonomous moving cleaning apparatus further includes an electronic switch controlled by the data values in the encrypted code data set and an analog/digital converter (A/D converter) for converting the low or high voltage formed by the light received by the light receiver to the corresponding digital signal.

5. The movement operation system of claim 1, wherein the autonomous moving cleaning apparatus is a floor sweeping machine.

6. The movement operation system of claim 1, wherein the encrypted infrared signal includes a first encrypted infrared signal with a first encrypted code and a first operating frequency and a second encrypted infrared signal with a second encrypted code and a second operating frequency.

7. The movement operation system of claim 1, wherein the virtual wall apparatus includes a power source module for providing electric power to the virtual wall apparatus.

8. A movement operation system for autonomous moving cleaning apparatus, comprising:
   at least one virtual wall apparatus including an infrared ray emitter which emits at least one encrypted infrared signal and includes a preset emission zone for the encrypted infrared signal to emit; and
   an autonomous moving cleaning apparatus including:
      a battery providing electric power for the autonomous moving cleaning apparatus to operate;
      a driving wheel for driving the autonomous moving cleaning apparatus to move;
      a dust suction fan motor for cleaning dirt on a floor;
      at least one servomotor for driving the driving wheel;

an infrared ray receiver for receiving the encrypted infrared signal;

a microcontroller unit which controls the servomotor to rotate and provides a digital signal processed via an encoding technique to form an encrypted code data set for sending out continuously and receives the encrypted infrared signal output from the infrared ray receiver when the autonomous moving cleaning apparatus enters the emission zone and decodes the encrypted infrared signal to generate a control signal for controlling the servomotor to move the autonomous moving cleaning apparatus away from the emission zone of the virtual wall apparatus;

a light emitter which is activated by a voltage sent and converted by the microcontroller unit;

a light receiver for receiving light from the light emitter and converting the light for sending to the microcontroller unit for operation; and a function key for selecting preset functions provided by the microcontroller unit to control the dust suction fan motor and the servomotor;

wherein the encrypted code data set includes data values which are converted to a low or a high voltage to activate the light emitter to generate dim or bright light, and wherein the light receiver receives the reflective dim or bright light from the light emitter continuously to form a corresponding low or high voltage which is then converted to a corresponding digital signal for providing to the microcontroller unit to compare with the encrypted code data set for decoding so that the microcontroller unit controls the servomotor to rotate forward, decelerate, rotate backward or stop rotating according to correctness of the decoding and the detected digital signal in a strong, weak, present or absent condition.

9. The movement operation system of claim 8, wherein the encrypted code data set is formed via a Manchester encoding technique.

10. The movement operation system of claim 8, wherein the microcontroller unit further includes an encoder for forming the encrypted code data set and a decoder for comparing the digital signal with the encrypted code data set for decoding.

11. The movement operation system of claim 8, wherein the autonomous moving cleaning apparatus further includes an electronic switch controlled by the data values in the encrypted code data set and an analog/digital converter (A/D converter) for converting the low or high voltage formed by the light received by the light receiver to the corresponding digital signal.

12. The movement operation system of claim 8, wherein the autonomous moving cleaning apparatus is a vacuum cleaner which includes a dust suction port at a lower side thereof connecting with the dust suction fan motor.

13. The movement operation system of claim 8, wherein the encrypted infrared signal includes a first encrypted infrared signal with a first encrypted code and a first operating frequency and a second encrypted infrared signal with a second encrypted code and a second operating frequency.

14. The movement operation system of claim 8, wherein the virtual wall apparatus includes a power source module for providing electric power to the virtual wall apparatus.

15. A movement operation system for autonomous moving cleaning apparatus, comprising:

at least one virtual wall apparatus including an infrared ray emitter which emits at least one encrypted infrared signal and includes a preset emission zone for the encrypted infrared signal to emit; and an autonomous moving cleaning apparatus including:

a battery providing electric power for the autonomous moving cleaning apparatus to operate;

a driving wheel for driving the autonomous moving cleaning apparatus to move;

at least one servomotor for driving the driving wheel;

an infrared ray receiver for receiving the encrypted infrared signal;

a microcontroller unit which controls the servomotor to rotate and provides a digital signal processed via an encoding technique to form an encrypted code data set for sending out continuously and receives the encrypted infrared signal output from the infrared ray receiver when the autonomous moving cleaning apparatus enters the emission zone and decodes the encrypted infrared signal to generate a control signal for controlling the servomotor to move the autonomous moving cleaning apparatus away from the emission zone of the virtual wall apparatus;

a light emitter which is activated by a voltage sent and converted by the microcontroller unit;

a light receiver for receiving light from the light emitter and converting the light for sending to the microcontroller unit for operation; and a function key for selecting preset functions provided by the microcontroller unit to control the servomotor;

wherein the encrypted code data set includes data values which are converted to a low or a high voltage to activate the light emitter to generate dim or bright light, and wherein the light receiver receives the reflective dim or bright light from the light emitter continuously to form a corresponding low or high voltage which is then converted to a corresponding digital signal for providing to the microcontroller unit to compare with the encrypted code data set for decoding so that the microcontroller unit controls the servomotor to rotate forward, decelerate, rotate backward or stop rotating according to correctness of the decoding and the detected digital signal in a strong, weak, present or absent condition.

16. The movement operation system of claim 15, wherein the encrypted code data set is formed via a Manchester encoding technique.

17. The movement operation system of claim 15, wherein the microcontroller unit further includes an encoder for forming the encrypted code data set and a decoder for comparing the digital signal with the encrypted code data set for decoding.

18. The movement operation system of claim 15, wherein the autonomous moving cleaning apparatus further includes an electronic switch controlled by the data values in the encrypted code data set and an analog/digital converter (A/D converter) for converting the low or high voltage formed by the light received by the light receiver to the corresponding digital signal.

19. The movement operation system of claim 15, wherein the autonomous moving cleaning apparatus is a floor moping machine which includes a floor moping element attached to a lower side thereof for cleaning dirt on a floor.

20. The movement operation system of claim 15, wherein the encrypted infrared signal includes a first encrypted infrared signal with a first encrypted code and a first operating frequency and a second encrypted infrared signal with a second encrypted code and a second operating frequency.

21. The movement operation system of claim 15, wherein the virtual wall apparatus includes a power source module for providing electric power to the virtual wall apparatus.

* * * * *